(12) United States Patent
Smith et al.

(10) Patent No.: US 11,265,172 B2
(45) Date of Patent: Mar. 1, 2022

(54) METHODS AND APPARATUS FOR OFFLOADING SIGNATURE REVOCATION CHECKING ON ACCELERATION CIRCUITRY

(71) Applicant: Intel Corporation, Santa Clara, CA (US)

(72) Inventors: Ned Smith, Beaverton, OR (US); Rajesh Poornachandran, Portland, OR (US); Sundar Nadathur, Cupertino, CA (US); Abdul M. Bailey, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 16/231,172

(22) Filed: Dec. 21, 2018

(65) Prior Publication Data
US 2019/0123912 A1 Apr. 25, 2019

(51) Int. Cl.
*H04L 9/32* (2006.01)
*H04L 9/08* (2006.01)
*H04L 9/30* (2006.01)

(52) U.S. Cl.
CPC .......... *H04L 9/3247* (2013.01); *H04L 9/0825* (2013.01); *H04L 9/0833* (2013.01); *H04L 9/0847* (2013.01); *H04L 9/0891* (2013.01); *H04L 9/3066* (2013.01); *H04L 9/3218* (2013.01); *H04L 9/3221* (2013.01)

(58) Field of Classification Search
None
See application file for complete search history.

(56) References Cited

U.S. PATENT DOCUMENTS

| | | | |
|---|---|---|---|
| 7,337,100 B1 * | 2/2008 | Hutton | G06F 30/39 703/13 |
| 8,415,974 B1 * | 4/2013 | Lysaght | H03K 19/17752 326/39 |
| 8,726,346 B2 | 5/2014 | Wang et al. | |
| 8,782,401 B2 | 7/2014 | Sarangdhar et al. | |
| 8,918,641 B2 | 12/2014 | Smith et al. | |
| 8,972,958 B1 * | 3/2015 | Brewer | G06F 8/447 717/141 |
| 9,294,274 B2 | 3/2016 | Smith | |
| 9,608,825 B2 | 3/2017 | Sarangdhar et al. | |
| 9,804,891 B1 * | 10/2017 | Adalier | H04L 9/002 |
| 10,120,798 B1 | 11/2018 | Smith et al. | |
| 2003/0131250 A1 * | 7/2003 | Quere | G06F 21/72 713/189 |

(Continued)

*Primary Examiner* — Taghi T Arani
*Assistant Examiner* — Joshua Raymond White (57) ABSTRACT

A system for supporting Enhanced Privacy Identification (EPID) is provided. The system may include a host processor operable to communicate with a remote requestor, where the host processor needs to perform signature revocation checking in accordance with EPID. To perform signature revocation checking, the host processor has to perform either a sign or verify operation. The host processor may offload the sign/verify operation onto one or more associated hardware acceleration coprocessors. A programmable coprocessor may be dynamically configured to perform the desired number of sign/verify functions in accordance with the requirements of the current workload.

16 Claims, 8 Drawing Sheets

(56) References Cited

U.S. PATENT DOCUMENTS

| | | | |
|---|---|---|---|
| 2008/0270790 A1* | 10/2008 | Brickell | G06F 21/57 713/158 |
| 2014/0032917 A1* | 1/2014 | Morioka | H04L 63/0428 713/176 |
| 2014/0215424 A1* | 7/2014 | Fine | G06F 30/34 716/117 |
| 2014/0324408 A1* | 10/2014 | Merten | G06F 8/35 703/21 |
| 2016/0050563 A1* | 2/2016 | Bronk | G06F 21/33 726/7 |
| 2017/0111333 A1 | 4/2017 | Smith | |
| 2017/0185814 A1* | 6/2017 | Smith | G06F 21/00 |
| 2020/0128042 A1* | 4/2020 | Ochoa | G06F 21/55 |

* cited by examiner

METHODS AND APPARATUS FOR OFFLOADING SIGNATURE REVOCATION CHECKING ON ACCELERATION CIRCUITRY

BACKGROUND

Enhanced Privacy Identification (EPID) is Intel® Corporation's recommended algorithm for attesting a trusted system while preserving privacy and anonymity. EPID is an asymmetric cryptographic algorithm that is based on the Elliptic-Curve Digital Signature Algorithm (ECDSA), which implements a group identity where individual group members possess a unique private key and where verification of each group member is accomplished using a group public key to verify each private key. In particular, EPID allows for a device to prove to an external party what kind of device it is (and optionally what software is running on that device) without having to provide the device identity (i.e., to allow the device to prove that it is an authentic member of the group without revealing which member it is).

In addition to the ability to verify group membership while maintaining anonymity, EPID also provides for the capability to revoke a private key given a signature created by that key, even if the private key itself is still unknown. EPID supports multiple forms of revocation checking such as "signature revocation checking" where the only way to detect a suspect compromised private key is to supply a list of suspect signatures at the time of signing. The suspect private key might not be known publicly, but the signature it creates is known to be fraudulent.

EPID is typically implemented in application-specific integrated circuits (ASICs), which are highly specialized devices hardwired to carry out a particular set of tasks. As new cryptographic algorithms emerge, as desired key lengths change during the lifetime of products implementing EPID, and as the ratio of signing to checking resources in a product changes over time, it is challenging or even impossible to update existing systems due to fixed or hardwired nature of the ASIC hardware; it is also extremely costly to replace or update those ASICs in the field, especially in Internet of Things (IoT) and Edge computing environments where EPID type algorithms are becoming prevalent. The cost of an irreparable hardware bug in the implementation of the signature revocation checking can be disastrous since security will be compromised.

Moreover, signature revocation checking in an ASIC is typically performed in a serialized manner, thus achieving only O(n) scalability. In other words, the time it takes to check all signatures will increase linearly as the number of revoked signatures increases. Offloading signature revocation checking to software is also not efficient since it is not hardware optimized. Software offloading is also much more susceptible to a variety of security attacks.

It is within this context that the embodiments described herein arise.

DETAILED DESCRIPTION

The present embodiments relate to a system operable to run cryptographic applications such as cryptographic applications implementing Enhance Privacy Identification (EPID) developed by Intel® Corporation. An EPID application may run on a host processor that is configured to perform signature verification operations such as signature revocation checking. The host processor may optionally offload the signature revocation checking onto one or more associated acceleration coprocessors such as an application-specific integrated circuit (ASIC), a programmable integrated circuit (e.g., a field-programmable gate array or FPGA), a graphics processing unit (GPU), a central processing unit (CPU), and/or even software.

The FPGA coprocessor may be dynamically (re)configured depending on the current workload of the EPID application. Since an FPGA can be dynamically customized for a specific workload, it can offer much higher performance compared to a general-purpose crypto ASIC device. Not only can FPGAs be heavily pipelined, but FPGAs can also replicate multiple parallel pipelines across its available logic fabric while offering custom data widths matching the key lengths and constantly changing algorithmic parameters (e.g., FPGAs can be readily upgraded in the field in response to evolving cryptographic key length requirements and new algorithms, even in IoT or Edge computing environments in remote locations). FPGA-based implementation can also have bug fixes rolled out easily as software patches, thus minimizing the impact of security compromises.

Signing and verification logic can also be implemented as separate partial reconfiguration (PR) regions on the FPGA. For example, multiple instances of signing bitstreams can be loaded into a first partially reconfigurable region on the FPGA, whereas multiple instances of verifying bitstreams can be loaded into a second partially reconfigurable region on the FPGA. Available logic resources on the FPGA can be dynamically (re)allocated to either signing or verifying bitstreams depending on the current workload (i.e., the ratio of signing and verification resources can be adjusted over time).

Moreover, as the number of revocations increases over the lifetime of a key, signature revocation resources can be incrementally added to the FPGA by programming the FPGA with more sign and/or verification instances. If a new key is created and workload is migrated to the new key, the existing revocation resources can be dynamically reset to account for the lack of revoked signatures. While the conventional serialized revocation checking on an ASIC only offers O(n) scalability, an FPGA-based implementation can offer O(1) scalability since the FPGA can be flexibly tuned to accommodate and handle an average number of revoked signatures for a given EPID deployment environment. Updates to the FPGA can optionally be monetized using a subscription model, which provides a new revenue stream for the reconfiguration bitstream provider.

It will be recognized by one skilled in the art, that the present exemplary embodiments may be practiced without some or all of these specific details. In other instances, well-known operations have not been described in detail in order not to unnecessarily obscure the present embodiments.

Cryptographic schemes such as Intel's EPID algorithm enables one party to prove that he is a member in good standing without having to reveal any information about his identity, thereby maintaining privacy and anonymity. EPID complies with international standards ISO/IEC 20008/20009 and is commonly used in the authentication of devices in Internet of Things (IoT) and Edge computing environments. Configurations relating to EPID will be described herein merely as an example, but the techniques can be applied to any type of cryptographic scheme that involves signing and verifying operations.

Figure 1:
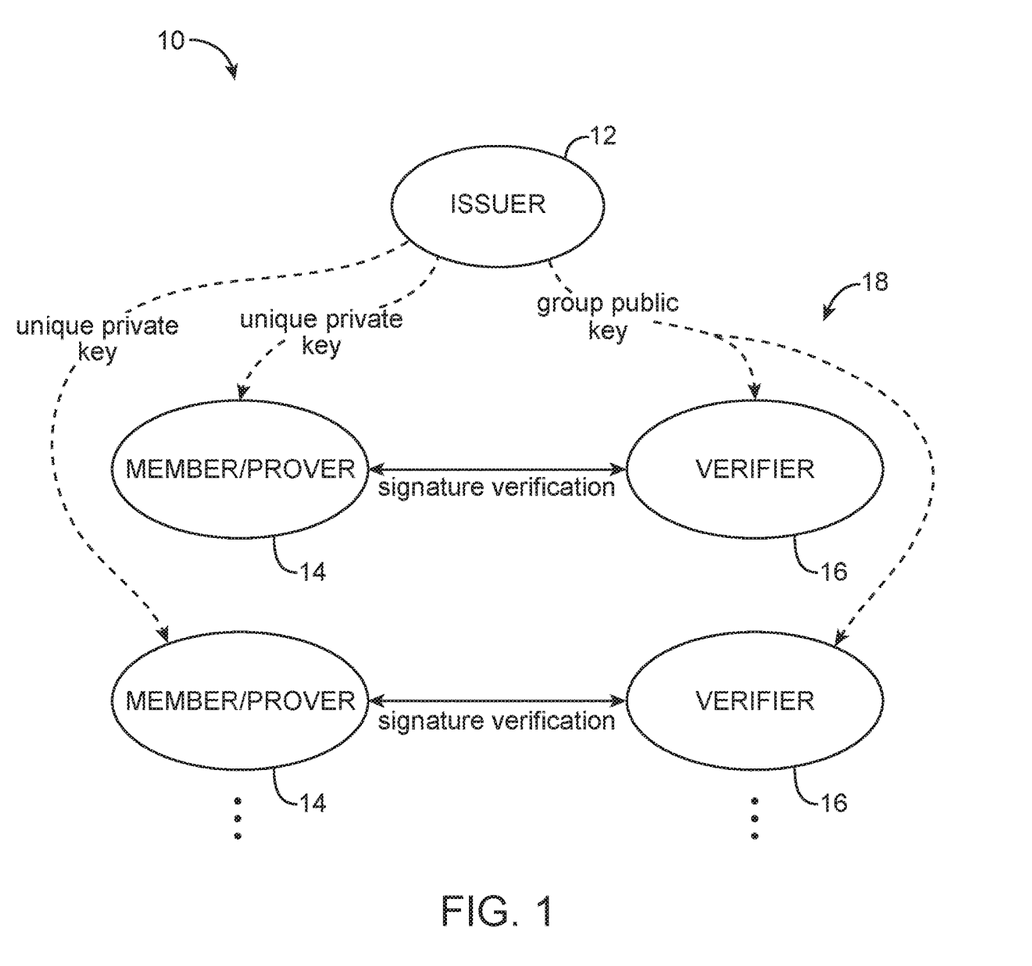
FIG. 1 is a diagram of an enhanced privacy system that includes an issuer, members, and verifiers in accordance with an embodiment.

FIG. 1 is a diagram of an enhanced privacy system 10 (e.g., a system that supports EPID). As shown in FIG. 1, system 10 may include an issuing entity such as issuer 12, member entities such as members 14, and verification entities such as verifiers 16. Issuer 12 may be configured to create a group public key and a group issuing private key (master key). Issuer 12 may publish and distribute the group public key to all associated entities (i.e., to every member 14 and every verifier 16 in a particular group). Issuer 12 may use the group issuing private key to assign a different unique private key (sometimes referred to as the EPID private key) to each member 14. All entities associated with a single public key and multiple private keys are sometimes referred to collectively as a "group" (see, e.g., group 18). The group can be given a name or identification number such as "g1" that identifies the group members 14 and verifiers 16 without distinguishing any specific private key.

Member 14 is an entity who is trying to prove its membership in the group. A member 14 is therefore sometimes referred to as a proving entity (or "prover"). Each member 14 can use its unique private key to digitally sign a message, and the resulting signature may be referred to as the EPID signature. A signature is an encrypted cryptographic hash of the message or data. The group public key can be used to verify signatures generated from any private key that is a member of the group. If prover 14 is indeed a member in the group with good standing (i.e., if the prover has a valid EPID private key that has not been revoked), the proof should be successful.

Verifier 16 is the entity configured to determine whether the prover 14 is indeed a member of the group. Verifier 16 can use the group public key to verify that the signature was indeed created by a member with a valid EPID private key without knowing any information about which unique private key was used to create that signature. This process is sometimes referred to as "signature verification." This is the basis for EPID having enhanced privacy properties since use of a member's private key does not distinguish it from another group member's private key (i.e., each member 14 has plausible deniability, and tracking transactions can only reveal patterns of the entire group). In an exemplary use case, issuer 12 may be Intel, member 14 may be a user device (e.g., a chipset, CPU, or graphics device), and verifier 16 could be software running on a host system or a server on the Internet.

As alluded to above, the proof of membership scheme primarily involves two operations: (1) a sign operation and (2) a verify operation. In a sign operation, a member 14 generates an EPID signature on a message using its unique private key and a signature revocation list. The signature revocation list (sometimes abbreviated as "SigRL") is an array of EPID signatures produced by other private keys associated with a common group public key. The group public key can be used to verify signatures generated from any private key that is a member of the group. If a signature is suspected of being created from a compromised private key, but the private key isn't exposed in clear text (i.e., the private key isn't publicly known), then the signature created from the suspect compromised private key can be placed on the revocation list. This revocation list is needed as the member/prover has to conduct "zero-knowledge" proofs to prove that he has not been revoked. In cryptography, a zero-knowledge proof is a method by which the prover can prove to the verifier that he knows a value x without conveying any information apart from the fact that they know the value x (i.e., without revealing x itself or any additional information). The output of the proof is part of the EPID signature.

A verifier 16 verifies the correctness of the EPID signature using the group public key. The verifier also checks that the creator of the EPID signature has not been revoked in the revocation list. The verifier should also check that the group public key has not been revoked. An exemplary signature verification scheme may therefore generally involve: (1) using a verifier to send a challenge message (including the latest signature revocation list) to a member; (2) using the member to sign the message using his unique private key and to send the resulting signature back to the verifier; and (3) using the verifier to verify the signature and to check that the member has not been revoked. This signature verification process that includes the use of the signature revocation list is sometimes referred to as "signature revocation checking."

Figure 2:
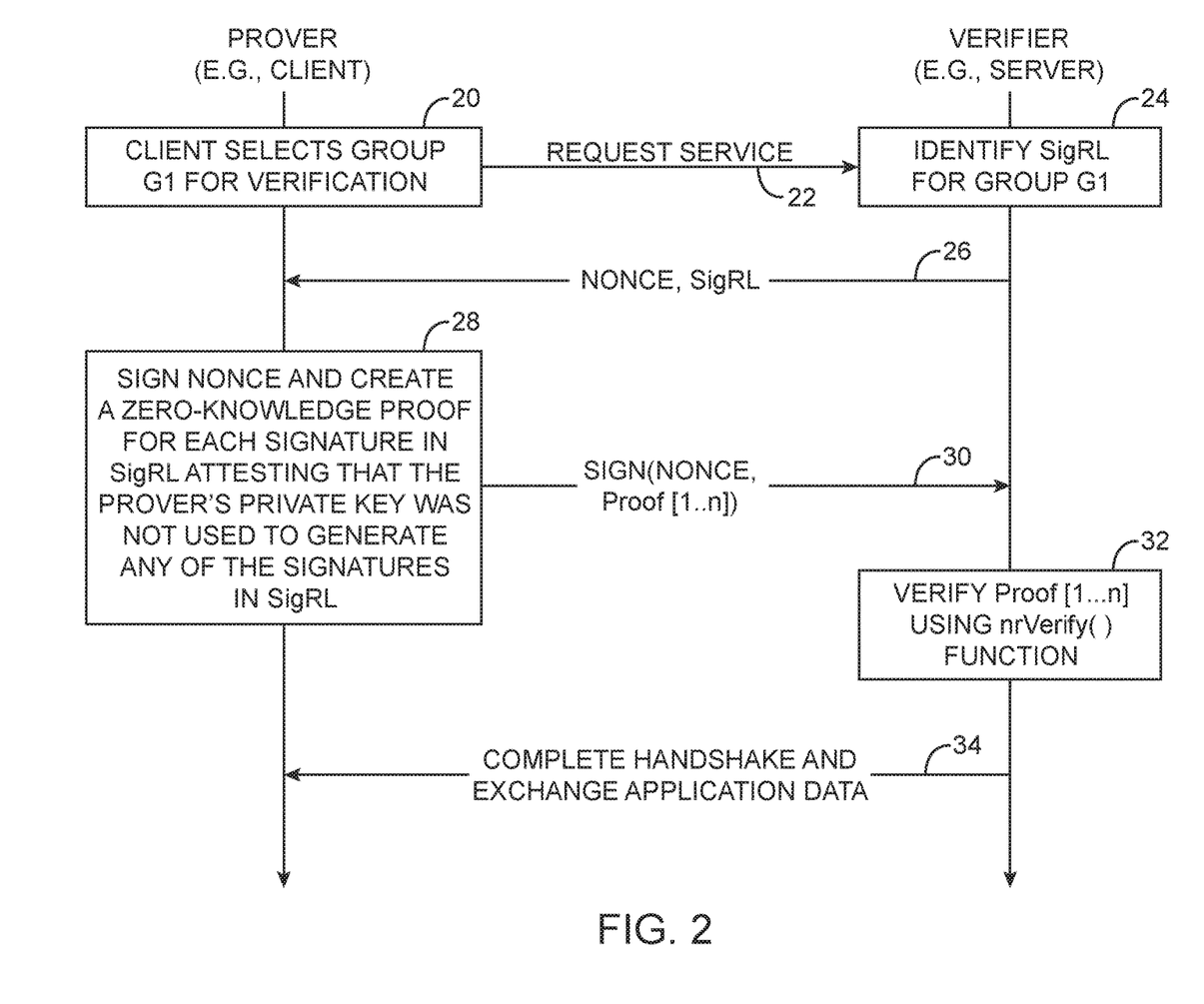
FIG. 2 is a flow chart of illustrative steps for performing signature revocation checking in accordance with an embodiment.

FIG. 2 is a flow chart of illustrative steps for performing signature revocation checking. At step 20, a prover (e.g., a client application running on a client endpoint device) may select a particular group such as group g1 for verification. As a result, the prover/member will issue a service request to the verifier (step 22).

At step 24, the verifier (e.g., a server or some other host system) may request the service request from the prover and may identify a signature revocation list SigRL associated with group g1. At step 26, the verifier may send a message with a nonce and the identified g1 SigRL back to the prover. The nonce may be an arbitrary number (e.g., a random or pseudo-random number) that is just used once in a cryptographic communication scheme.

At step 28, the prover may sign the nonce and create a zero-knowledge proof for each of the n signatures in SigRL attesting that the prover's private key was not used to generate any of the signatures in SigRL (e.g., using proof function nrProve( )). At step 30, the signature (which includes the signed nonce and the n zero-knowledge proofs) are sent from the prover to the verifier.

At step 32, the verifier may analyze the received signature and verify the n zero-knowledge proofs using verify function nrVerify( ) Once all the proofs have been successfully verified (e.g., once the verifier confirms that the signatures in SigRL were not generated previously by the prover's private key), the handshaking protocol is complete and application data can be freely exchanged (at step 34).

Figure 3:
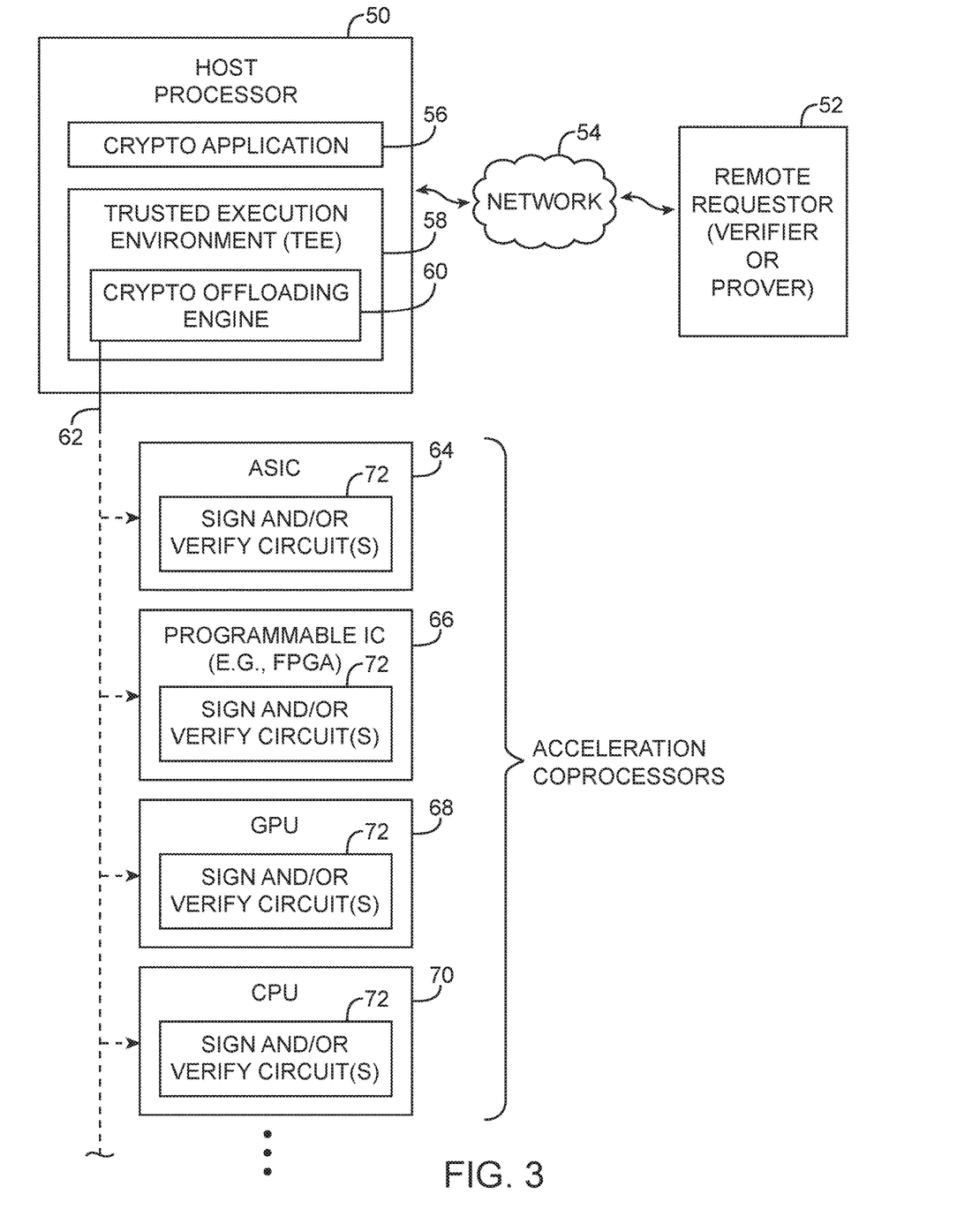
FIG. 3 is a diagram showing how signature revocation checking may be offloaded from a host processor onto one or more acceleration coprocessor(s) in accordance with an embodiment.

FIG. 3 is a diagram showing how signature revocation checking may be offloaded from a host processor onto one or more acceleration coprocessors. As shown in FIG. 3, a host processor such as host processor 50 may be coupled to a remote requestor 52 via network 54. Remote requestor 52 may be a verifier or a prover. If remote requester 52 is a verifier, host processor 50 may operate as a prover. If requestor 52 is a prover, host processor 50 may operate as a verifier. A cryptography application such as application 56 may run on host processor 50. Cryptography application 56 may communicate with a remote application running on the network-connected remote requestor 52 to perform EPID signing or verification functions during signature revocation checking operations. Application 56 may forward a sign or verify request to a trusted execution environment (TEE) 58, where TEE 58 may perform the signing/verification operations locally if it is already optimized for asymmetric cryptographic algorithms such as the Elliptic-Curve Digital Signature Algorithm (ECDSA).

In accordance with an embodiment, TEE 58 may have a cryptography offloading engine such as offloading engine 60 configured to offload the sign/verify operations onto one or more acceleration coprocessors coupled to host processor 50 via path 62. Hardware acceleration devices may be used for co-processing in big-data, fast-data, or high performance compute (HPC) applications. By offloading computationally intensive tasks from host processor 50 one or more of the coprocessors, host processor 50 is freed up to perform other critical processing tasks. The use of hardware accelerators can therefore help deliver improved speeds, latency, power efficiency, and flexibility for cryptography, end-to-end cloud computing, networking, storage, artificial intelligence, autonomous driving, virtual reality, augmented reality, gaming, and other data-centric applications.

An example of an acceleration coprocessor is an application-specific integrated circuit (ASIC), which includes circuits 72 specially customized to perform sign and/or verify functions. Circuits 72 on ASIC device 64 may offer the highest performance for a particular usage scenario but is generally hardwired and cannot be reconfigured or reallocated in runtime after fabrication.

The acceleration processors may also include a programmable logic device such as a field-programmable gate array (FPGA) device 66. FPGA 66 may include programmable circuits 72' that can be configured to perform sign and/or verify functions. Circuits 72' on programmable device 66 can be dynamically reconfigured or reprogrammed after fabrication to suit the particular needs of the host processor 50.

Other acceleration processors that could also be coupled to host processor 50 include a graphics processing unit (GPU) such as GPU 68, central processing unit (CPU) such as CPU 70, or other suitable types of processing devices. GPU 68 and CPU 70 may also include circuits 72 that are capable of performing sign and/or verify functions offloaded from host processor 50.

Use of FPGA 66 as an acceleration coprocessor may be particularly beneficial since it can offer the most flexibility in terms of the type of computing resources that are available on a coprocessor. An FPGA may include a large number of programmable logic components any portion/subset of which can be dynamically reconfigured to perform the desired sign and/or verify operations.

Figure 4:
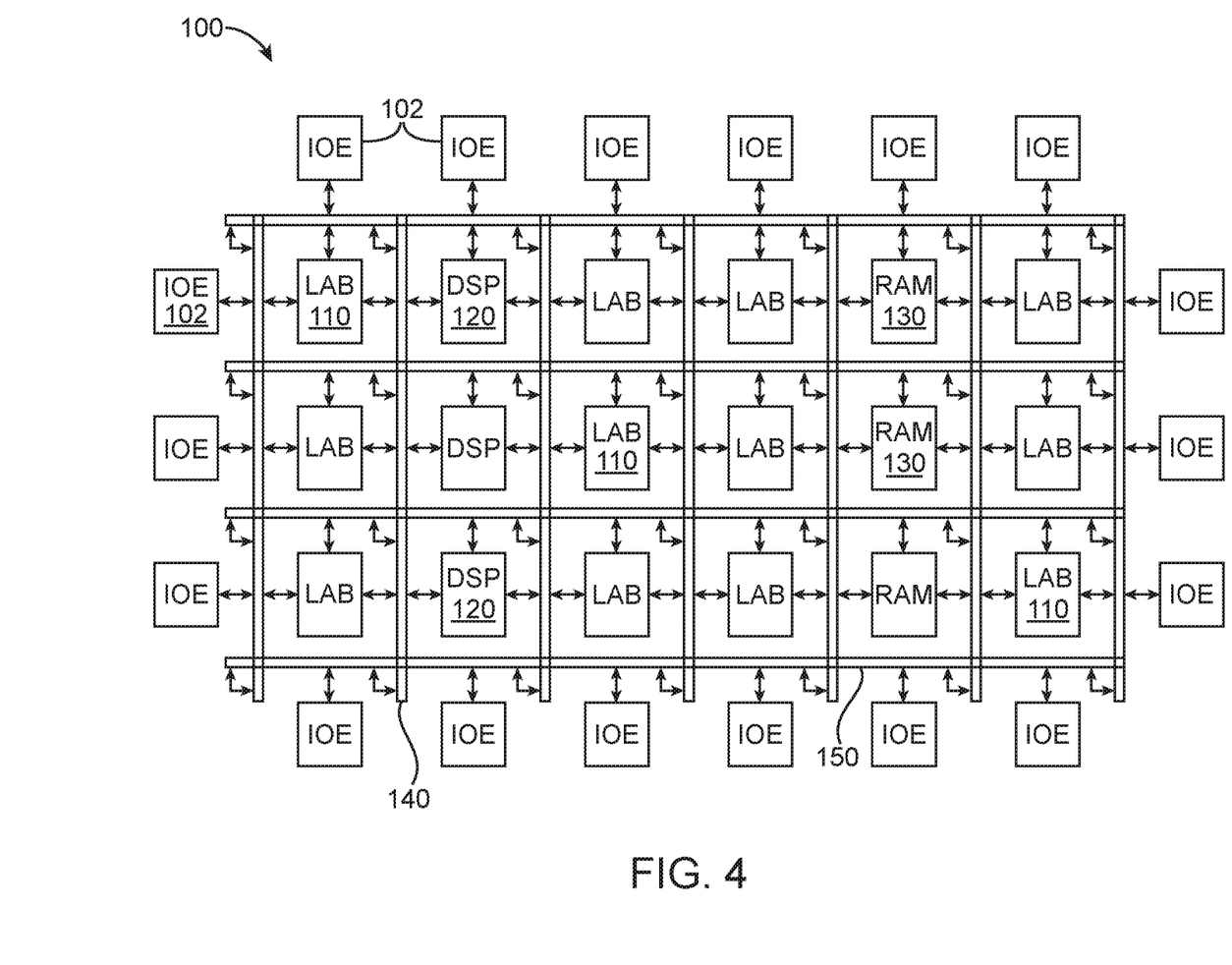
FIG. 4 is a diagram of a programmable logic device (PLD) in accordance with an embodiment.

FIG. 4 shows how programmable device 100 (e.g., an FPGA die of the type that may be used as an acceleration coprocessor) may include a two-dimensional array of functional blocks, including logic array blocks (LABs) 110 and other functional blocks, such as random-access memory (RAM) blocks 130 and digital signal processing (DSP) blocks 120. Functional blocks such as LABs 110 may include smaller programmable regions (e.g., logic elements, configurable logic blocks, or adaptive logic modules) that receive input signals and perform custom functions on the input signals to produce output signals. LABs 110 may also be grouped into larger programmable regions sometimes referred to as logic sectors that are individually managed and configured by corresponding logic sector managers. The grouping of the programmable logic resources on device 100 into logic sectors, logic array blocks, logic elements, or adaptive logic modules is merely illustrative. In general, device 100 may include functional logic blocks of any suitable size and type, which may be organized in accordance with any suitable logic resource hierarchy.

Programmable logic device 100 may contain programmable memory elements. Memory elements may be loaded with configuration data (also called programming data or configuration bitstream) using input-output elements (IOEs) 102. Once loaded, the memory elements each provide a corresponding static control signal that controls the operation of an associated functional block (e.g., LABs 110, DSP 120, RAM 130, or input-output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration random-access memory (CRAM), or programmable memory elements. Programmable logic device (PLD) 100 may be configured to implement a custom circuit design. For example, the configuration RAM may be programmed such that LABs 110, DSP 120, and RAM 130, programmable interconnect circuitry (i.e., vertical channels 140 and horizontal channels 150), and the input-output elements 102 form the circuit design implementation.

In addition, the programmable logic device may have input-output elements (IOEs) 102 for driving signals off of device 100 and for receiving signals from other devices. Input-output elements 102 may include parallel input-output circuitry, serial data transceiver circuitry, differential receiver and transmitter circuitry, or other circuitry used to connect one integrated circuit to another integrated circuit.

Device 100 may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement. In general, the combination of the programmable logic (e.g., LABs 110 and other configurable logic components) and the programmable routing circuitry (e.g., vertical routing channels 140 and horizontal routing channels 150) on device 100 may be referred to as "soft logic."

Figure 5A:
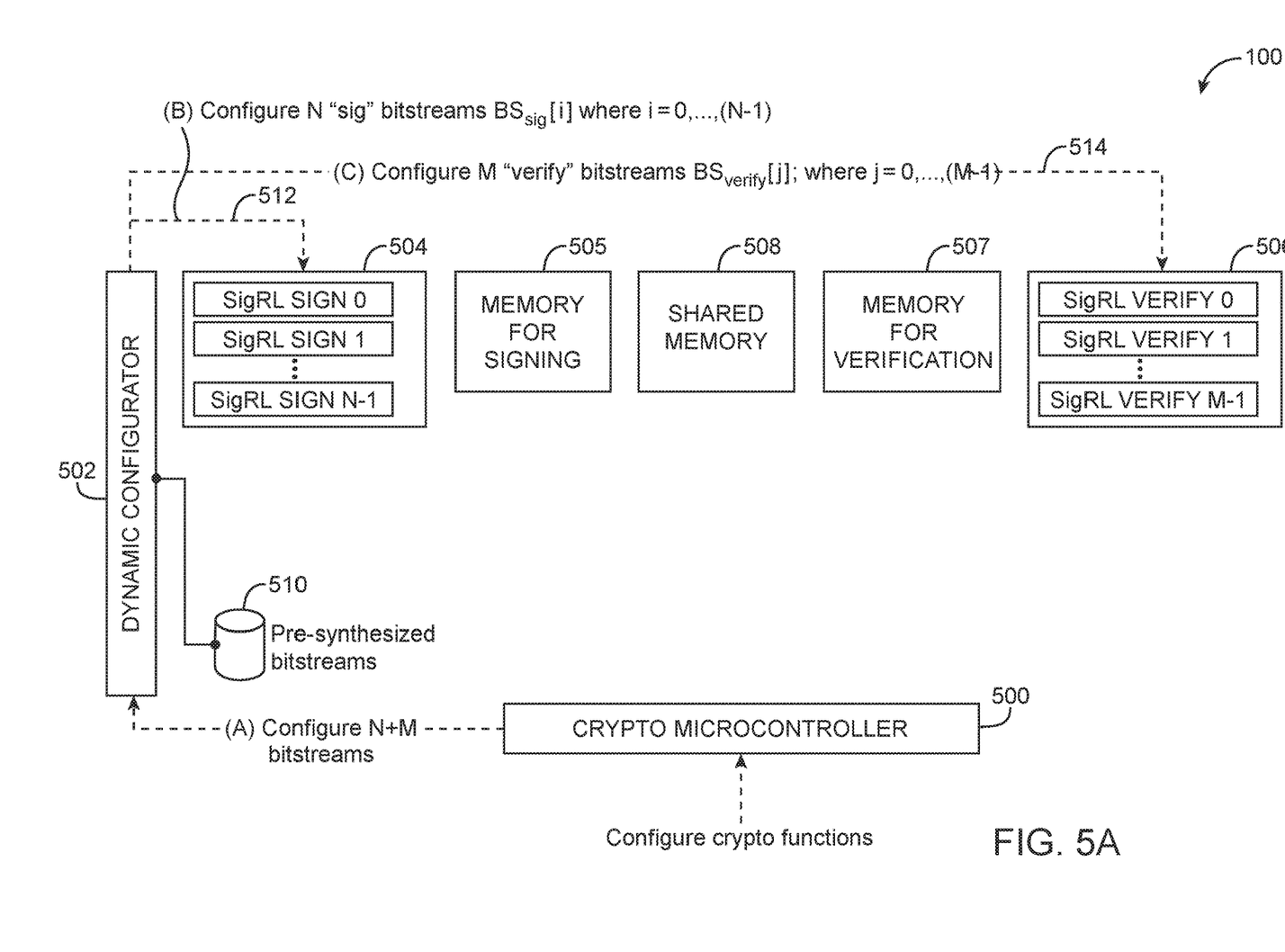
FIG. 5A is a diagram illustrating the flow of signals during device configuration operations in accordance with an embodiment.

FIG. 5A is a diagram illustrating the flow of signals when initially setting up or performing device configuration on device 100 (e.g., an FPGA device). As shown in FIG. 5A, device 100 may further include a control circuit such as cryptography microcontroller 500, a configuration circuit such as dynamic configurator 502, a local storage circuit such as storage 510, programmable resources 504 allocated for sign operations, programmable resources 506 allocated for verify operations, memory 505 for storing data processed from the signing operations, memory 507 for storing data processed from the verification operations, and shared memory 508 for storing information common to both sign/verify operations.

Microcontroller 500 may interact with a host TEE (e.g., trusted execution environment 58 in FIG. 3) to dynamically construct one or more parallel instances/copies of a sign function (e.g., a sign function for generating a signature revocation proof) and/or to dynamically construct one or more parallel instances/copies of a verify function (e.g., a verify function for verifying a signature revocation proof) that scales O(1) with the number of signature proofs needed. In response to receiving a command to configure cryptography functions at microcontroller 500, microcontroller 500 may direct dynamic configurator 502 to configure N instances of the requisite sign function and to configure M instances of the requisite verify function. N may be any non-negative integer that is different or equal to integer M.

To implement these sign/verify instances, dynamic configurator 502 may retrieve configuration data from storage 510, which serves as a local repository of pre-synthesized sign and verify configuration bitstreams. Upon retrieving the pre-synthesized configuration bitstreams from storage 510 (e.g., a local bitstream repository), configurator 502 may implement multiple SigRL signing functions by loading N copies of the sign bitstreams into programmable logic 504 (as indicated by path 512) and may implement multiple SigRL verification functions by loading M copies of the verify bitstreams into programmable logic resources 506 (as indicated by path 514). The implemented SigRL signing functions are capable of creating a signature in accordance with step 28 in FIG. 2, whereas the implemented SigRL verifying functions are capable of verifying the signature in accordance with step 32. In other words, each of the sign functions implemented in logic 504 may be configured to perform an nrProve( ) function, whereas each of the verify functions implemented in programmable logic resources 506 may be configured to perform an nrVerify( ) function. No data is loaded into memory 505, 507, or 508 during the setup/configuration phase.

Figure 5B:
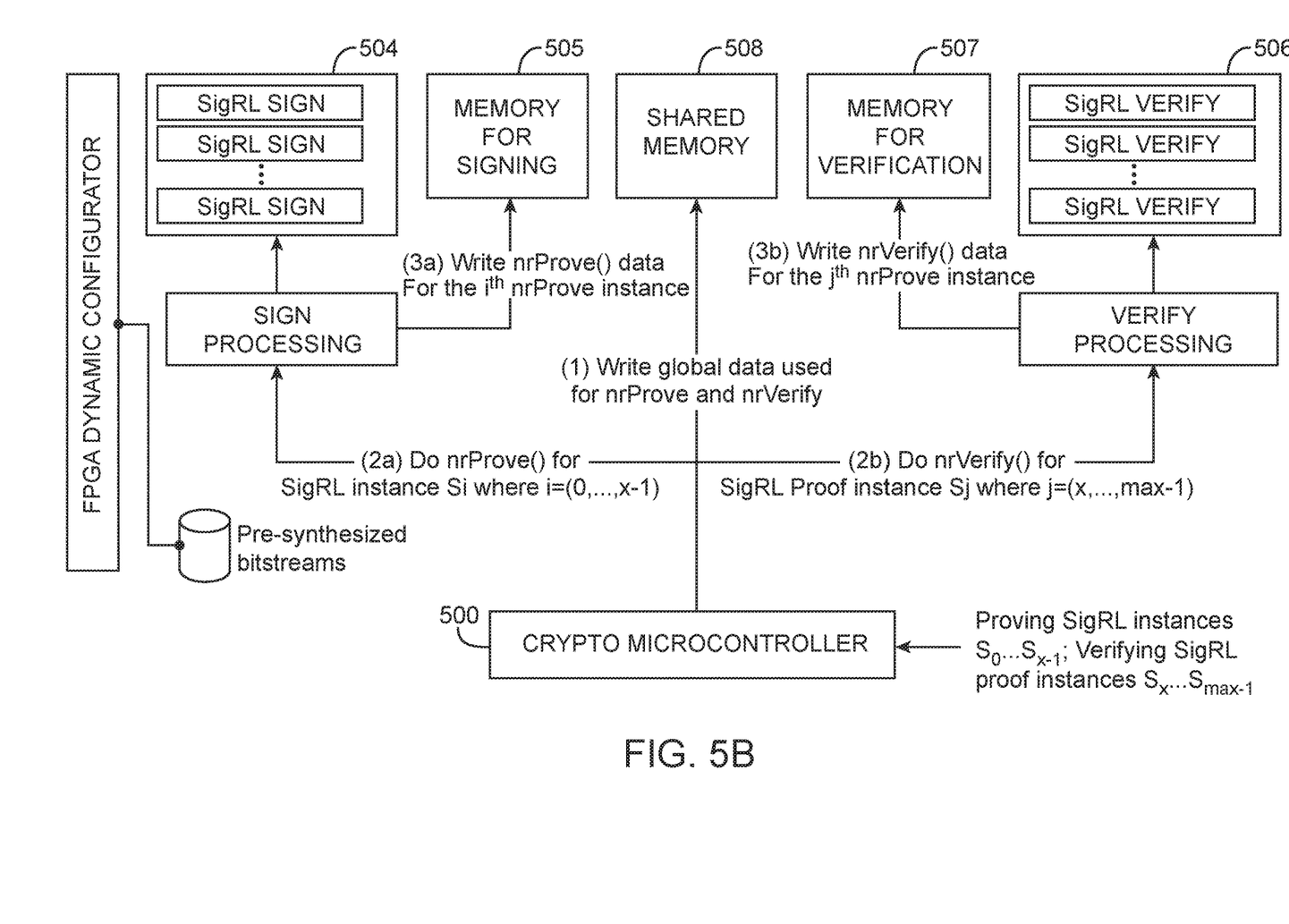
FIG. 5B is a diagram illustrating the flow of signals during execution of sign or verify operations in accordance with an embodiment.

Microcontroller 500 manages the execution of sign/verify operations once the correct configuration has been set up. FIG. 5B is a diagram illustrating the flow of signals during execution of sign or verify operations. Microcontroller 500 may obtain parameterized data values that are either shared by all the loaded bitstreams or are specific to a particular set of bitstreams and programs the appropriate registers. As shown in FIG. 5B, microcontroller 500 may receive a request to perform EPID functions such as to prove SigRL instances $S_0 \ldots S_{x-1}$ (i.e., to prove a number of signatures in the provided revocation list) and/or to verify SigRL proof instances $S_x \ldots S_{max-1}$ (i.e., to verify a number of proofs generated as a result of the provided revocation list).

In response to receiving this request, microcontroller 500 may write global data used for the nrProve( ) and nrVerify( ) functions at step (1). At step (2a), microcontroller 500 may issue a command that directs the multiple parallel instances of sign functions to perform nrProve( ) for a number of signatures $S_0$ to $S_{x-1}$ in the signature revocation list SigRL. Alternatively, at step (2b), microcontroller 500 may issue a command that directs the multiple parallel instances of verify functions to perform nrVerify( ) for a number of proofs $S_x$ to $S_{max-1}$ associated with SigRL.

Since the multiple bitstreams are operated in parallel, they may all execute the requisite function and return corresponding result at approximately the same time. Data generated as a result of the sign/nrProve( ) processing may be written into memory 505 (at step 3a). These proofs can be lumped into an EPID signature and returned back to the host EPID application (e.g., application 56 in FIG. 3) for further processing. Data generated as a result of the nrVerify( ) function processing may be written into memory 507 (at step 3b). These results, which show whether or not one or more signatures have failed, can also be returned back to the host EPID application to determine whether signature revocation processing has succeeded or failed.

The time it takes to perform a sign operation (Ts) is expressed as follows:

$$Ts = t\_bsc + t\_smp + t\_bmp + t\_bss + tsch\_prio$$

where t_bsc represents the amount of time needed to configure the sign bitstreams into programmable logic 504, where t_smp is the amount of time needed to properly provision data into shared memory 508, where t_bss is the amount of time needed to execute the nrProve( ) function, and where tsch_prio is the amount of wait time required for the needed resource in PLD 100 to become available. In general, tasks with different priority levels will be scheduled accordingly. For example, a lower priority task may be asked to wait for a higher priority task to complete. The run time amount assigned to the higher priority tasks may be added to tsch_prio.

Similarly, the time it takes to perform a verify operation (Tv) is expressed as follows:

$$Tv = t\_bsc + t\_smp + t\_bmp + t\_bsv + tsch\_prio$$

where t_bsc represents the amount of time needed to configure the sign bitstreams into programmable logic 504, where t_smp is the amount of time needed to properly provision data into shared memory 508, where t_bsv is the amount of time needed to execute the nrVerify( ) function, and where tsch_prio is the amount of time this task needs to block given a current task already in progress on the FPGA.

The host processor may determine whether it makes sense to offload a sign or verify operation onto an FPGA accelerator such as PLD 100 by computing a point of diminishing return. The threshold for determining the point of diminishing return for sign and verify operations may be computed as follows:

$$Ds = 1 - (Ts/Th) \quad (1)$$

$$Dv = 1 - (Tv/Th) \quad (2)$$

where Ds is the threshold for a sign operation, where Dv is the threshold for a verify operation, and where Th is the time required to perform the operation on the host processor or TEE. A larger computed threshold value would tend to indicate that offloading to the FPGA is desirable, whereas a smaller computed threshold value would tend to show offloading to the FPGA is unnecessary. The TEE can estimate the threshold values by observing previous operations involving different SigRL sizes executed on different processors. Continuous monitoring could result in threshold estimates that take into consideration caching strategies employed by the dynamic configurator that may choose to keep some number of sign/verify bitstreams in place following a previous configuration event.

Figure 6:
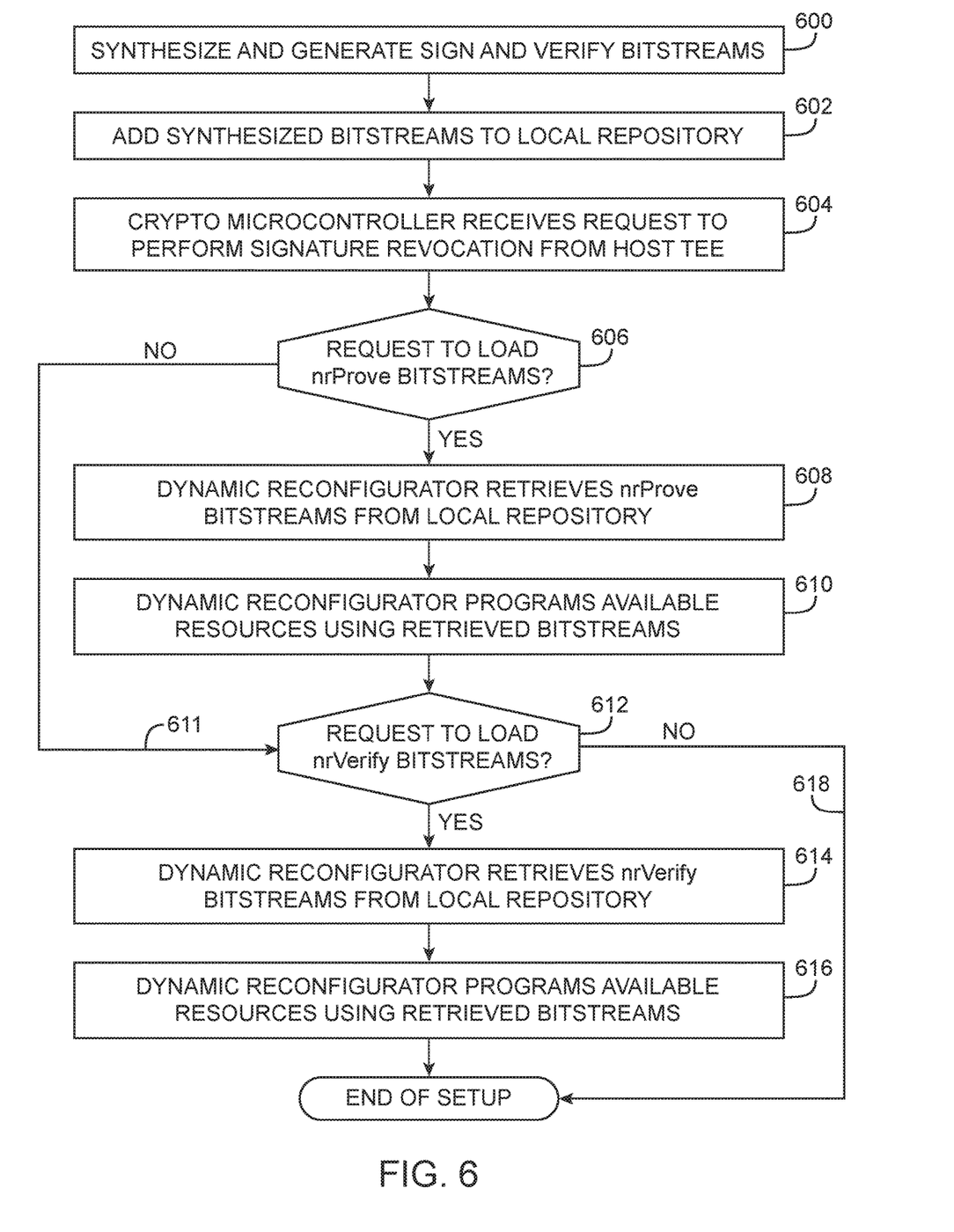
FIG. 6 is a flow chart of illustrative steps for setting up or dynamically (re)configuring programmable resources on a PLD in accordance with an embodiment.

FIG. 6 is a flow chart of illustrative steps for initially setting up or dynamically (re)configuring programmable logic resources on an FPGA such as PLD 100 (see, e.g., steps A, B, and C in FIG. 5A). At step 600, a computer-aided design tool such as Intel's Quartus® integrated circuit design software may be used to synthesis and generate sign and verify bitstreams (e.g., to generate a configuration bitstream that programs the FPGA with multiple parallel instances of customized logic blocks configured to perform nrProve( ) or nrVerify( ) functions). At step 602, these CAD-tool-synthesized bitstreams can be loaded into and stored in the local repository of storage 510 on the FPGA.

At step 604, microcontroller 500 may receive a request from the host TEE to perform signature revocation checking, which involves either performing a series of nrProve( ) functions or a series of nrVerify( ) functions. At step 606, microcontroller 500 may analyze the request to determine whether or not to load nrProve( ) bitstreams into the FPGA. In response to determining that nrProve bitstreams are needed, microcontroller 500 may direct dynamic configurator 502 to retrieve nrProve( ) bitstreams from local storage 510 (step 608). At step 610, dynamic configurator 502 may then program logic resources 504 using the retrieved bitstreams to implement the nrProve( ) functions.

In response to determining that nrProve bitstreams are not needed (as shown by 611), processing may proceed to step 612. At step 612, microcontroller 500 may analyze the request to determine whether or not to load nrVerify( ) bitstreams into the FPGA. In response to determining that nrVerify bitstreams are needed, microcontroller 500 may direct dynamic configurator 502 to retrieve nrVerify( ) bitstreams from local storage 510 (step 614). At step 616, dynamic configurator 502 may then program logic resources 506 using the retrieved bitstreams to implement the nrVerify( ) functions. If no verify bitstreams are needed, setup is complete as indicated by bypass path 618.

The setup flow of FIG. 6 shows configuration of both nrProve( ) and nrVerify( ) functions. While it is likely that both sign and verify operations would be supported by the FPGA, it is possible that the FPGA may be specialized for only the sign operation or only the verify operation.

After the FPGA is initially loaded with a set of configuration bitstreams, the FPGA may be optionally reconfigured by loading a different set of configuration data. Sometimes, it may be desirable to reconfigure only a portion of the programmable logic on device 100 via a process sometimes referred to as "partial reconfiguration" (PR). As programmable memory cells are typically arranged in an array, partial reconfiguration can be performed by writing new data values only into selected portion(s) in the array while leaving portions of array other than the selected portion(s) in their original state. Performing partial reconfiguration during runtime enables a portion of device 100 to be dynamically reconfigured without having the turn off the entire device, thereby minimizing system downtime.

Figure 7:
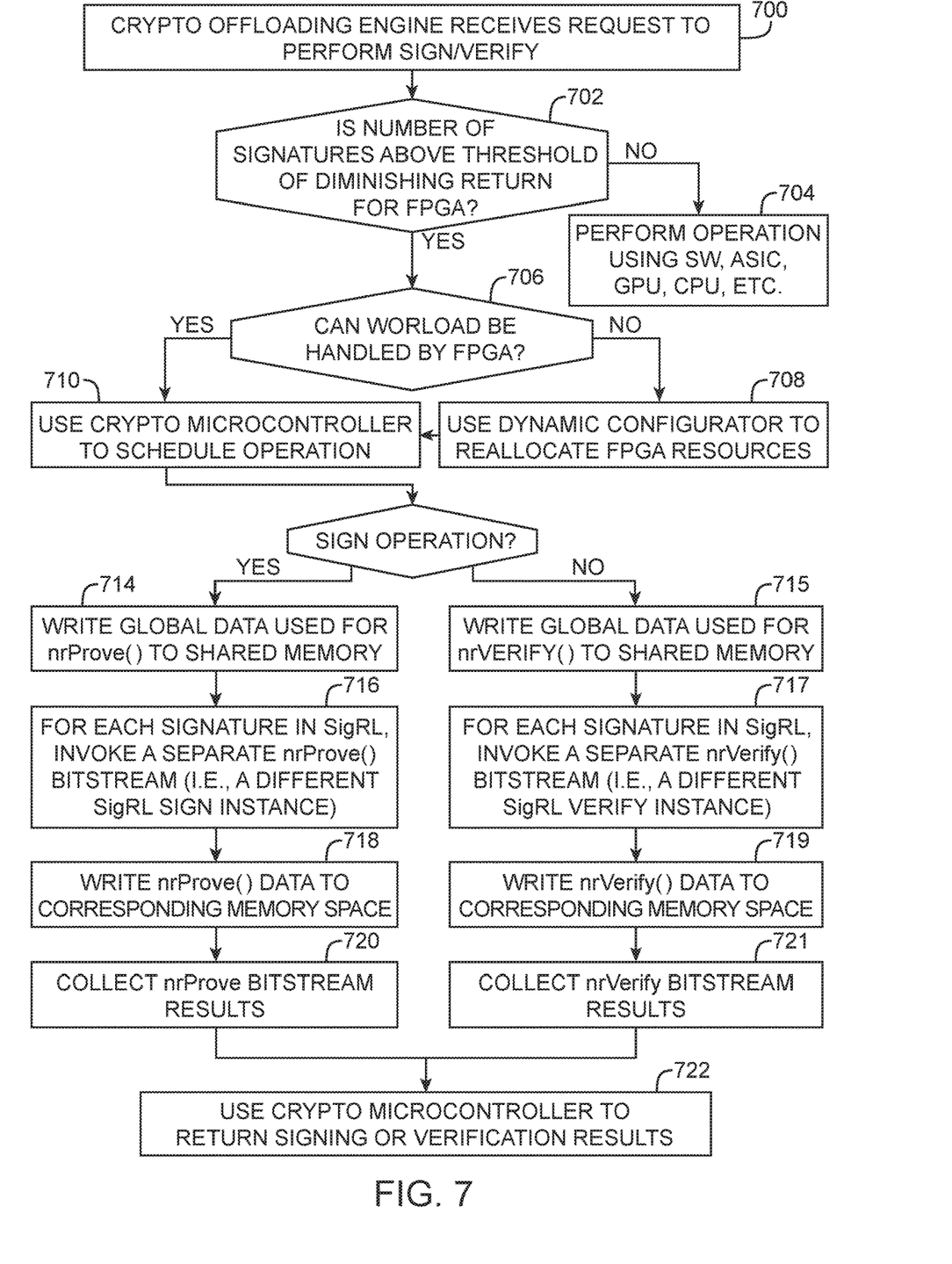
FIG. 7 is a flow chart of illustrative steps for processing sign or verify operations on a PLD in accordance with an embodiment.

FIG. 7 is a flow chart of illustrative steps for processing sign or verify operations on an FPGA such as PLD 100 (see, e.g., steps 1-3 in FIG. 5B). At step 700, offloading engine 58 or host TEE 58 may receive a request from a remote network-connected requestor to perform a sign or verify operation. At step 702, the offloading engine 58 or host TEE 508 may determine whether the number of signatures that needs to be processed (e.g., the number of signatures in the received SigRL or the number of proofs that needs to be verified) is above a threshold of diminishing returns for the FPGA (e.g., see threshold value Ds and Dv computed using equations 1 and 2 above). If not, the requested sign/verify operation may be performed using software running on the host at step 704, using ASIC coprocessor 64 (see FIG. 3), using GPU coprocessor 68, using CPU coprocessor 70, using cloud servers, or using other network processors or transporters, etc., that may have desirable performance trade-off benefits as determined by an appropriate threshold calculation.

If the number of signatures/proofs is above the computed threshold of diminishing returns, offloading engine 60 or microcontroller 500 may then determine whether the requested workload can be handled by the current configuration of the FPGA (at step 706). If not, dynamic configurator 502 on the FPGA may be directed to reallocate the programmable resources on the FPGA by either reconfiguring the device with more instances of sign bitstreams or more instances of verify bitstreams (at step 708). This reallocation of programmable resources may be performed via full device configuration (see, e.g., FIGS. 5A and 6) or via dynamic partial reconfiguration to minimize system downtime. The reconfigured FPGA should now be optimized to handle the current workload efficiently.

Following step 708 or in response to determining that the requested workload can indeed be handled by the current configuration of the FPGA, microcontroller 500 may schedule either a sign operation or a verify operation at step 710. To execute a sign operation, microcontroller 500 may first write global data that is used for nrProve( ) functions to shared memory (at step 714). At step 716, the FPGA will invoke a separate nrProve( ) functional instance for each signature in signature revocation list SigRL (see, e.g., step 28 in FIG. 2). At step 718, the nrProve( ) data may be written into corresponding memory space 505. The results from each nrProve bitstream may be collected at step 720.

To execute a verify operation, microcontroller 500 may first write global data that is used for nrVerify( ) functions to shared memory (at step 715). At step 717, the FPGA will invoke a separate nrVerify( ) functional instance for each signature in signature revocation list SigRL (see, e.g., step 32 in FIG. 2). At step 719, the nrVerify( ) data may be written into corresponding memory space 507. The results from each nrVerify bitstream may be collected at step 721. At step 722, microcontroller 500 may then return the sign or verification results back to the host processor.

FIG. 7 again show the operational flow for both sign and verify functions but could optionally be optimized to target one or the other where performance gains may be realized given the application context that favors one over the other. If desired, the configuration and operation flows of FIGS. 6 and 7 may also employ other optimizations that leaves some number of bitstreams intact across requests (such as via dynamic partial reconfiguration) to minimize re-configuration overhead.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is an integrated circuit, comprising: a microcontroller configured to receive a request from an external host processor to perform a cryptographic process on the integrated circuit; and programmable logic configured to perform a sign operation or a verify operation for the cryptographic process.

Example 2 is the integrated circuit of example 1, wherein the cryptographic process optionally comprises an asymmetric cryptographic process.

Example 3 is the integrated circuit of example 2, wherein the asymmetric cryptographic process optionally comprises Enhanced Privacy Identification (EPID), wherein the EPID implements a group identity, wherein members of the same group identity each possess a unique private key, and wherein the verify operation uses a single public key to verify each unique private key.

Example 4 is the integrated circuit of example 3, wherein the asymmetric cryptographic process optionally further comprises EPID signature revocation checking.

Example 5 is the integrated circuit of any one of examples 1-4, optionally further comprising: a dynamic configuration circuit that loads a plurality of bitstreams into configuration memory cells on the integrated circuit to configure the programmable logic to perform the sign operation or the verify operation.

Example 6 is the integrated circuit of example 5, optionally further comprising: a local storage circuit configured to store pre-synthesized bitstreams directly on the integrated circuit, wherein the plurality of bitstreams that the dynamic configuration circuit uses to load into the configuration memory cells is retrieved from the local storage circuit.

Example 7 is the integrated circuit of any one of examples 1-6, optionally further comprising memory configured to store data resulting from the sign operation.

Example 8 is the integrated circuit of any one of examples 1-7, optionally further comprising additional memory configured to store data resulting from the verify operation.

Example 9 is the integrated circuit of any one of examples 1-8, optionally further comprising shared memory configured to store global data used for both the sign and verify operations.

Example 10 is the integrated circuit of any one of examples 1-9, wherein the programmable logic optionally comprises: a first portion configured to implement a plurality of prove functions executable in parallel for the sign operation; and a second portion configured to implement a plurality of verify functions executable in parallel for the verify operation.

Example 11 is a method of operating an integrated circuit, comprising: configuring programmable logic on the integrated circuit so that the programmable logic is operable to perform a first number of sign operations and a first number of verify operations; with a microcontroller on the integrated circuit, receiving a request from an external host processor to perform a cryptographic process involving the sign and verify operations; determining whether the programmable logic is optimized to handle the received request; and in response to determining that the programmable logic is not optimized to handle the received request, dynamically reconfiguring the programmable logic so that the reconfigured programmable logic is operable to perform a second number of sign operations that is different than the first number of sign operations and to perform a second number of verify operations that is different than the first number of verify operations, wherein the reconfigured programmable logic is optimized to handle the received request.

Example 12 is the method of example 11, wherein the cryptographic process optionally comprises Enhanced Privacy Identification (EPID) signature revocation checking.

Example 13 is the method of any one of examples 11-12, optionally further comprising: receiving a signature revocation list from the external host processor; and using the reconfigured programmable logic to perform the sign operations by conducting a plurality of zero-knowledge proofs for signatures in the received signature revocation list.

Example 14 is the method of example 13, optionally further comprising sending the plurality of zero-knowledge proofs back to the external host processor.

Example 15 is the method of any one of examples 11-12, optionally further comprising: receiving a plurality of proofs from the external host processor; and using the reconfigured programmable logic to perform the verify operations on the plurality of proofs.

Example 16 is the method of example 15, optionally further comprising sending verification results back to the external host processor.

Example 17 is the method of any one of examples 11-16, optionally further comprising: writing global data used for both the sign and verify operations into a shared memory on the integrated circuit; writing results from the sign operations into first dedicated memory on the integrated circuit; and writing results from the verify operations into second dedicated memory on the integrated circuit that is separate from the first dedicated memory.

Example 18 is a system, comprising: a host processor operable to communicate with a remote requestor to perform Enhanced Privacy Identification (EPID) operations; and a hardware acceleration coprocessor coupled to the host processor, wherein the host processor is further operable to offload at least some of the EPID operations onto the hardware acceleration coprocessor to free up processing power on the host processor.

Example 19 is the system of example 18, wherein the hardware acceleration coprocessor optionally comprises a processing circuit selected from the group consisting of: an application-specific integrated circuit (ASIC), a programmable logic device (PLD), a graphics processing unit (GPU), and a central processing unit (CPU).

Example 20 is the system of example 18, wherein the hardware acceleration coprocessor optionally comprises a field-programmable gate array (FPGA) device, and wherein the host processor is optionally operable to calculate a threshold of diminishing returns to determine whether or not to offload the at least some of the EPID operations onto the FPGA device.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
    a microcontroller configured to receive a request from an external host processor to perform a cryptographic process on the integrated circuit;
    programmable logic configured to perform a first number of sign operations and a first number of verify operations for the cryptographic process; and a dynamic configuration circuit configured to dynamically reconfigure the programmable logic so that the reconfigured programmable logic is configured to perform a second number of sign operations that is different than the first number of sign operations and to perform a second number of verify operations that is different than the first number of verify operations in response to a determination that the programmable logic is not optimized to handle the request, wherein the reconfigured programmable logic comprises first parallel instances of sign functions configured to implement a plurality of prove functions executable in parallel for the sign operations, wherein the reconfigured programmable logic further comprises second parallel instances of verify functions configured to implement the verify functions executable in parallel for the verify operations, wherein the cryptographic process comprises an asymmetric cryptographic process, wherein the asymmetric cryptographic process comprises Enhanced Privacy Identification (EPID), wherein the EPID implements a group identity, wherein members of the same group identity each possess a unique private key, and wherein each of the verify operations uses a single public key to verify each of the unique private keys.

2. The integrated circuit of claim 1, wherein the asymmetric cryptographic process further comprises EPID signature revocation checking.

3. The integrated circuit of claim 1, wherein the dynamic configuration circuit loads a plurality of bitstreams into configuration memory cells on the integrated circuit to configure the programmable logic to perform the sign operations or the verify operations.

4. The integrated circuit of claim 3, further comprising:
    a local storage circuit configured to store pre-synthesized bitstreams directly on the integrated circuit, wherein the plurality of bitstreams that the dynamic configuration circuit uses to load into the configuration memory cells is retrieved from the local storage circuit.

5. The integrated circuit of claim 1, further comprising:
    memory configured to store data resulting from the sign operations.

6. The integrated circuit of claim 1, further comprising:
    memory configured to store data resulting from the verify operations.

7. The integrated circuit of claim 1, further comprising:
    shared memory configured to store global data used for both the sign and verify operations.

8. The integrated circuit of claim 1, wherein the reconfigured programmable logic is optimized to handle the request.

9. A method of operating an integrated circuit, comprising:
    configuring programmable logic on the integrated circuit so that the programmable logic is operable to perform a first number of sign operations and a first number of verify operations;
    with a microcontroller on the integrated circuit, receiving a request from an external host processor to perform a cryptographic process involving the sign and verify operations;
    determining whether the programmable logic is optimized to handle the received request; and
    in response to determining that the programmable logic is not optimized to handle the received request, dynamically reconfiguring the programmable logic so that the reconfigured programmable logic is operable to perform a second number of sign operations that is different than the first number of sign operations and to perform a second number of verify operations that is different than the first number of verify operations, wherein the reconfigured programmable logic comprises first parallel instances of sign functions configured to implement a plurality of prove functions executable in parallel for the sign operations, wherein the reconfigured programmable logic further comprises second parallel instances of verify functions configured to implement the verify functions executable in parallel for the verify operations, wherein the cryptographic process comprises an asymmetric cryptographic process, wherein the asymmetric cryptographic process comprises Enhanced Privacy Identification (EPID), wherein the EPID implements a group identity, wherein members of the same group identity each possess a unique private key, and wherein each of the verify operations uses a single public key to verify each of the unique private keys.

10. The method of claim 9, wherein the cryptographic process comprises Enhanced Privacy Identification (EPID) signature revocation checking.

11. The method of claim 9, further comprising:
    receiving a signature revocation list from the external host processor; and
    using the reconfigured programmable logic to perform the sign operations by conducting a plurality of zero-knowledge proofs for signatures in the received signature revocation list.

12. The method of claim 11, further comprising:
    sending the plurality of zero-knowledge proofs back to the external host processor.

13. The method of claim 9, further comprising:
    receiving a plurality of proofs from the external host processor; and
    using the reconfigured programmable logic to perform the verify operations on the plurality of proofs.

14. The method of claim 13, further comprising:
    sending verification results back to the external host processor.

15. The method of claim 9, further comprising:
    writing global data used for both the sign and verify operations into a shared memory on the integrated circuit;
    writing results from the sign operations into first dedicated memory on the integrated circuit; and writing results from the verify operations into second dedicated memory on the integrated circuit that is separate from the first dedicated memory.

16. The method of claim 9, wherein the reconfigured programmable logic is optimized to handle the request.

* * * * *